United States Patent Office 3,135,473
Patented June 2, 1964

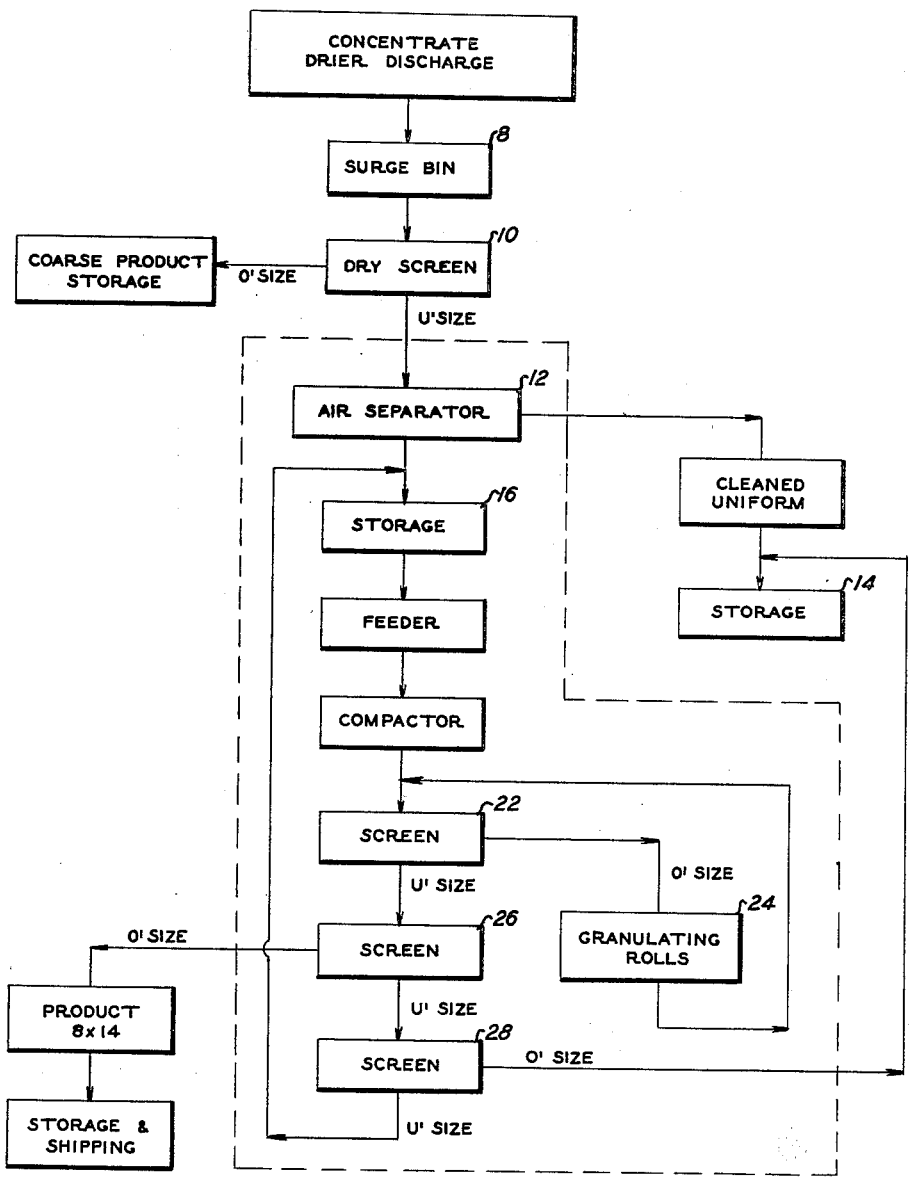

3,135,473
PROCESS OF CONVERTING POTASSIUM CHLORIDE FINES INTO A RELATIVELY COARSE GRANULAR PRODUCT BY COMPACTION
Dale L. Schrader, Odessa, Tex., and Bob K. Gregory, San Jose, Calif., assignors to American Metal Climax, Inc., New York, N.Y., a corporation of New York
Filed Mar. 21, 1962, Ser. No. 183,323
4 Claims. (Cl. 241—3)

This invention relates to an improved process of converting potassium chloride fines into a relatively coarse, free-flowing granular product by compaction. More particularly, the invention is concerned with a process of compacting fine potassium chloride wherein fine KCl in a substantially dry state is fed under careful control as to the bulk density thereof between rolls which subject the same to a high degree of compaction. As compared with certain prior processes, our process has the advantage that it eliminates any need for the addition of moisture to aid in the compaction and may be conducted with fine material that is fed to the process at room temperature.

In the potash industry it is customary to subject the crude ore to grinding or crushing to flotation feed size and then separate the valuable potassium chloride from the gangue constituents by flotation. As thus recovered, the KCl is in finely divided form with a considerable proportion consisting of particles ranging from 65 mesh to 200 mesh and even finer in size.

One of the principal uses of KCl is for fertilizer or as an ingredient of mixed fertilizers. For such purpose it is desirable that the KCl shall be relatively uniform and coarse in size so that it will have a tendency to flow freely when applied by conventional fertilizer distributors. In recent years it has become a more or less general practice to subject the KCl product of the flotation process, after drying, to screening to separate the product into fractions whereof the particles are more uniform in size. In some cases, the dry screening is so conducted as to produce a relatively coarse fraction which consists of particles +28 mesh in size and which is designated in the trade as "coarse" muriate of potash. This coarse product demands a premium price. The undersize from this screening operation is designated as "uniform" or "standard" muriate of potash and is sold at a somewhat lower price, or in some cases, is further screened or subjected to other classification treatment to separate out an oversize fraction which is also designated as "uniform" or "standard" muriate of potash.

The present invention has for an object to convert the extremely fine particles from the above classification step into a relatively coarse product comparable as to marketability with the "coarse" muriate of potash which is sold at a premium price.

The invention has for a further object to improve the uniformity of particle size of the fraction that has heretofore been sold as the "uniform" or "standard" product.

The invention has for a still further object to improve the $K_2O$ content of the fraction that has heretofore been sold as a "uniform" or "standard" product.

Proposals have been made for converting finely divided materials of various kinds into more useful forms by precedures involving the addition of a controlled amount of moisture or other agent to act as a binder and then compressing, drying and granulating the resulting product. The process involving the addition of moisture to fine particles of KCl has various disadvantages such as a tendency for the wetted material to adhere to the rolls or other means employed for compressing the particles together, and, furthermore, requires an additional drying step to remove the moisture that is added in the binding step.

We have found that surprising and unexpected results may be obtained in producing relatively coarse dry granular material from fine KCl particles without resort to the addition of moisture or another liquid binding agent and that the particles can be in a completely dry or substantially dry state throughout the compaction treatment. More particularly, we have found that when the extremely fine particles, which have heretofore been regarded as producing an inferior fertilizer product, are associated with a controlled minor proportion of relatively coarse particles to insure controlled bulk density of the mixture and the resulting mixture is subjected to relatively high compression by passing between heavy rolls, they are converted into a plastic sheet or flakes, which, when appropriately granulated and screened, yield a coarse dense product that has the highly desirable properties of the "coarse" potash presently marketed as a premium product for the fertilizer trade.

The invention will be more particularly described by reference to the attached drawing wherein is set forth in flow sheet form the presently preferred arrangements for carrying out the compaction process.

According to the embodiment of the process outlined in the flow sheet, the KCl which has been separated from the gangue by a flotation treatment is passed through dryers, not shown, and either after cooling to room temperature or while still hot from the drying step, is subjected to dry screening to recover as the oversize a product consisting principally of the +28 mesh particles. Usually about one-half of the material received onto the screen from the dryer is separated as the oversize or coarse product. The undersize, which may be regarded as the starting material for practicing the present invention, is subjected to a suitable dry classification, as for example, by air separation, which is so conducted as to produce a fine fraction of the desired bulk density for the feed to the compacting machine. The remaining coarser fraction from the classification step consists essentially of +65 mesh particles and consititutes a so-called cleaned "uniform" or "standard" product. Removal of the fines in the dry classification step makes this a more desirable potash product with a higher $K_2O$ content than the "uniform" or "standard" product heretofore produced.

In order to insure the desired degree of compaction of the fine fraction from the air separation or other dry classification step, it is important that the tapped bulk density be maintained as high as practicable. Tapped bulk density tests are run by standard procedures known to those familiar with the art. Good compaction results are obtained with bulk densities of 75 lbs per cubic foot or above, with the result being progressively better as the density is increased up to 80 lbs. per cubic foot. When the bulk density is increased to above 80 lbs. per cubic foot little further improvement is noted. However, below about 75 lbs. is a critical feature, as the sheet formed below this level tends to break down to the original particle size of the material fed to the compactor. The reason for this is not known but it is thought that the increased air becomes entrapped and prevents the formation of a plastic sheet, i.e., a sheet without any space between adjacent crystals, whereby the sheet density is equivalent to the density of the material. Bulk densities of the order above indicated can be easily obtained by appropriate distribution of the particle sizes.

According to illustrated embodiment of the invention, the finer fraction from the regulated air separation is joined with a flow of finer particles from the succeeding compaction step hereinafter described, and the combined flow is then fed to a mixer where the two flows are mixed to insure thorough intermingling of the particles. Here again the bulk density is important and the mixture must be controlled so that the feed density is kept at or above 75 lbs. per cubic foot. The resulting mixture is then fed to the compactor which preferably comprises two 18″ diameter by 24″ long smooth faced, shaft mounted, rolls with one roll gear driven by the other. The mixture of KCl particles to be compacted is fed into a hopper above the rolls from which it passes between the rolls and is subjected to a high pressure. One of the rolls is supported in stationary bearings and the other is provided with means for applying hydraulic pressure through its bearings.

We have found that in order to insure satisfactory results when operating on a substantially dry feed of the controlled bulk density above mentioned, it is important to maintain a pressure of at least 135,000 lbs. per bearing or a total of 270,000 lbs., this being equivalent to 11,250 lbs. per linear inch and about 8,000 lbs. (8 kips) per square inch. Still better results are obtained when the total pressure is maintained at at least 330,000 lbs. Stated differently, we prefer to so operate in the compaction step as to insure that a pressure of about 13,750 lbs. or more per linear inch of the rolls (9.8 kips per square inch) is exerted upon the material being fed therebetween at the "bite" of the rolls. Even higher pressures may be used to advantage and the invention is not deemed to be limited to the particular pressure range of 8 to 9.8 kips above mentioned. Lower pressures than those above mentioned have not insured satisfactory results in producing a product of the desired density and stability. Surprisingly enough, NaCl requires 40 to 50 kips to achieve the same results.

We avoid the conventional practice of adding moisture to the feed material because it destroys the "bite" characteristics of the rolls on the material. It also destroys the fluidity of the material immediately above the roll surfaces which is essential to satisfactory compaction; that is, the moisture prevents the free flow of material into the rolls and reduces the bulk density at the point of contact and prevents compaction. Although in some cases a slightly better product can be produced from feed material maintained at elevated temperatures, entirely satisfactory results are obtained at lower temperatures down to room temperature when the feed possesses the proper bulk density and pressures are maintained as hereinbefore disclosed.

The feed leaves the dryers while heated to around 340° F. and cools to about 200° F. or less in passing through the screening plant, the air separator and the storage bin ahead of the compactor.

In order to insure a satisfactory "bite" of the rolls upon the fine material being compacted between them, it is important to provide a sufficient head of the fine material being fed to the rolls and to insure that nothing is interposed in the line of flow from the hopper to the rolls that will interfere with the free feed of the fine material. The desired "bite" of the rolls is insured when the feed hopper is maintained full and no obstruction to flow through the hopper is present within 18 to 24″ from the top of the rolls.

Referring more particularly to the figure of the drawing, the concentrates discharged from the dryer are received into a storage or surge bin 8 and then fed to a dry screen 10. The oversize or coarser fraction consisting principally of particles +28 mesh in size is passed as "coarse" muriate of potash to the coarse product storage. The undersize from the screen 10 is passed to a conventional air separator 12 so adjusted and operated as to separate out a fine fraction such that any given volume thereof contains a minimum of air voids and has a bulk density of 75 lbs. or greater when determined in the manner familiar to those skilled in the art of determining bulk density of solid particulate materials. It is common knowledge that no one screen analysis can be given to correspond to a given bulk density. Since in determining the bulk density of a mixture of classified particles a tapping procedure is used to insure that the maximum of voids and interstices are filled, it becomes obvious that an infinite number of screen analyses can give the same bulk density. A typical analysis of the feed to the compactor which will have a bulk density of 78 lbs. per cubic foot is:

|  | Mesh |
|---|---|
| 5% | +35 |
| 50% | +65 |
| 67% | +100 |
| 92% | +200 |

These are cumulative percentages of the fine material retained on the screens.

The compacted material passing from the compactor rolls is fed to a 6-mesh screen 22. The oversize from this screen is passed to a series of granulating rolls 24 and then recycled to the screen 22.

The granulating rolls may take various forms. We have found it advantageous to use two sets of rolls in series. One of the rolls of each set is provided with longitudinal serrations and the other roll is provided with circumferential serrations. One roll of each set runs at a speed slightly greater than the other. The second set of rolls is mounted just below the first set and is identical, except that the serrations are smaller. The action is such that the flat cakes or flakes coming from the compactor rolls are, in effect, chewed into bits rather than being reduced by impact or friction grinding.

The underflow from the screen 22 is fed to screen 26. The oversize from this screen constitutes a coarse granular product. Preferably, a 10-mesh screen is employed which insures that the recovered oversize granular product will have a particle size range of approximately 8 to 14 mesh. This product now has the following typical analysis:

|  | Mesh |
|---|---|
| 15.9% | +8 |
| 75.4% | +10 |
| 95.2% | +14 |
| 97.3% | +20 |
| 2.7% | −20 |

The undersize from screen 26 is fed to a fines screen 28, say, of 28 mesh, from which the oversize is passed to the cleaned uniform storage 14 and forms a part of the cleaned uniform product. The undersize from the screen 28 is recycled to the storage bin 16 and joined with the fresh fines feed from the air separator 12. Both the granular and cleaned uniform products recovered from the compaction step show a highly satisfactory density, the specific gravity being of the order of 1.995 or approximately the same as that of ordinary crystalline KCl.

It will be understood that the screen sizes specified for the various separations may be varied to some extent depending upon operating conditions and the desired particle size ranges of the various products produced. Likewise, variations in the particle size range and the proportions of the coarse and fine particles in the compaction feed, that is, +35 or +65 mesh, or −100 mesh or −200 mesh, may be brought about without departing from the invention except that these proportions shall be such that the bulk density of the material shall be 75 lbs. per cubic foot or greater. It will be obvious to one skilled in the art that as the amount of the material passing through the finer screen increases then it is necessary that the amount of coarser particles be increased in order to maintain a bulk density in the satisfactory range. Conversely, when the amount of material passing through the finer screen decreases, it is necessary that the proportion of coarser particles be decreased. As previously indicated higher compaction pressures than those specifically mentioned may also be employed, and when higher pressures are used considerably more variations in the range of bulk density may occur.

This application is a continuation-in-part of application Serial No. 764,807 filed October 2, 1958, now abandoned.

We claim:

1. The process of converting potassium chloride fines into a relatively coarse, free flowing granular product which comprises subjecting a substantially dry fine fraction having a bulk density of at least 75 lbs. per cubic foot to compaction by passage between rolls imparting a pressure of at least 8 kips per square inch to the fine fraction being fed therethrough and thereby producing a dense sheet, thereafter granulating the sheet and screening to separate oversize and undersize fractions from the desired coarse granular product.

2. The process of converting potassium chloride fines into a relatively coarse, free flowing granular product according to claim 1 wherein the screen oversize from the granulating step is recycled and subjected to further granulation.

3. The process according to claim 1 wherein the fine fraction has a bulk density of about 80 lbs. per cubic foot of volume.

4. The process according to claim 1 wherein said pressure is about 10 kips.

References Cited in the file of this patent

UNITED STATES PATENTS

| | | |
|---|---|---|
| 2,485,128 | Adams | Oct. 18, 1949 |
| 2,623,243 | Jean et al. | Dec. 30, 1952 |
| 3,048,478 | Smith | Aug. 7, 1962 |

FOREIGN PATENTS

| | | |
|---|---|---|
| 517,036 | Canada | Sept. 27, 1955 |